United States Patent [19]
Webb et al.

[11] Patent Number: 5,419,108
[45] Date of Patent: May 30, 1995

[54] METHOD OF FORMING A SEGMENTED ROUND BALE

[75] Inventors: Bryant F. Webb, Ephrata, Pa.; Jan C. van Groenigen, Varsenare, Belgium

[73] Assignee: New Holland North America, Inc., New Holland, Pa.

[21] Appl. No.: 241,102

[22] Filed: May 9, 1994

[51] Int. Cl.6 .............................................. A01F 15/07
[52] U.S. Cl. ........................................ 56/341; 100/88; 100/97
[58] Field of Search ................. 56/341; 100/6, 88, 94, 100/95, 96, 97, 98 R

[56] References Cited

U.S. PATENT DOCUMENTS

| | | | |
|---|---|---|---|
| 2,893,308 | 7/1959 | Bodisch | 100/15 |
| 3,899,964 | 8/1975 | Molitorisz | 100/89 |
| 4,497,163 | 2/1985 | Ogman | 56/341 |
| 4,549,481 | 10/1985 | Groeneveld et al. | 100/98 R |
| 4,870,812 | 10/1989 | Jennings et al. | 56/341 |
| 4,955,188 | 9/1990 | von Allwörden | 100/97 X |
| 5,205,105 | 4/1993 | Krone et al. | 53/118 |

FOREIGN PATENT DOCUMENTS 3719845 12/1988 Germany .............................. 56/341

Primary Examiner—David J. Bagnell
Attorney, Agent, or Firm—Larry W. Miller; Frank A. Seemar

[57] ABSTRACT

A round baler, having a pair of spaced side walls mounted on a main frame, is supported on wheels and adapted to be pulled across a field. A crop confining apron is mounted between the side walls for defining an expandable chamber that is adapted to rotatably form a cylindrical package of crop material between the side walls. A pickup picks up crop material and conveys it into the chamber through a generally transverse crop infeed opening operatively associated with the pickup. A transverse starter roll extends between the side walls to provide the upper limit of the infeed opening. A crop severing device extends into the expandable chamber in the vicinity of the starter roll to cut crop material on the surface of the cylindrical package as it is being formed.

7 Claims, 4 Drawing Sheets

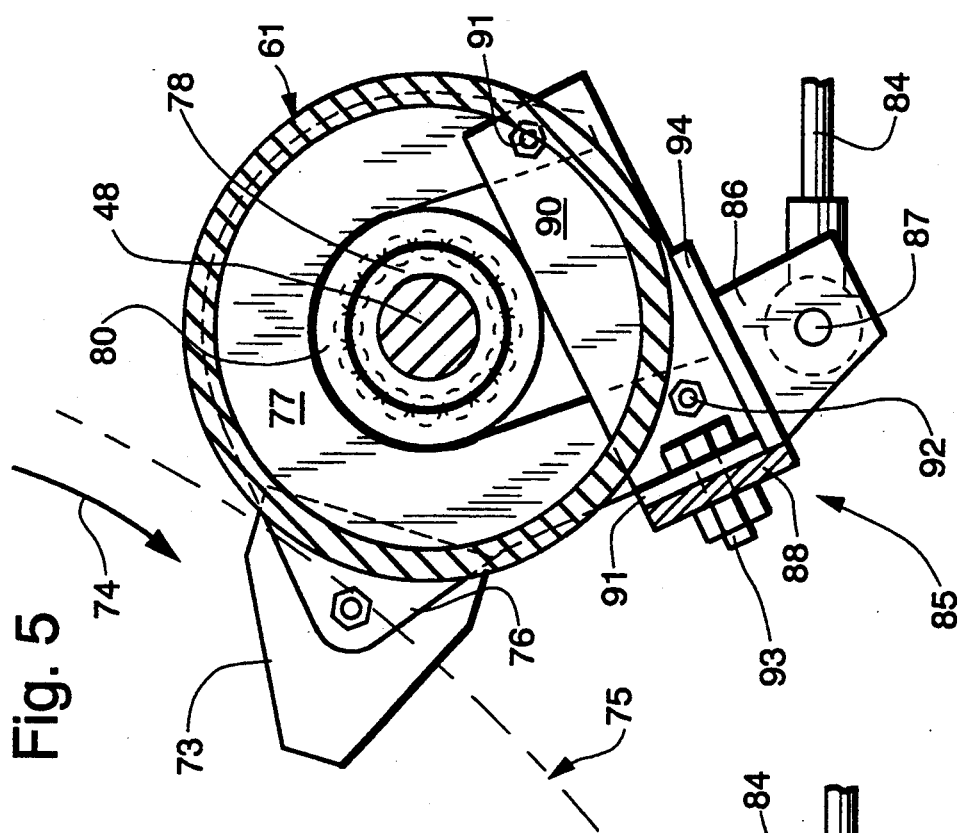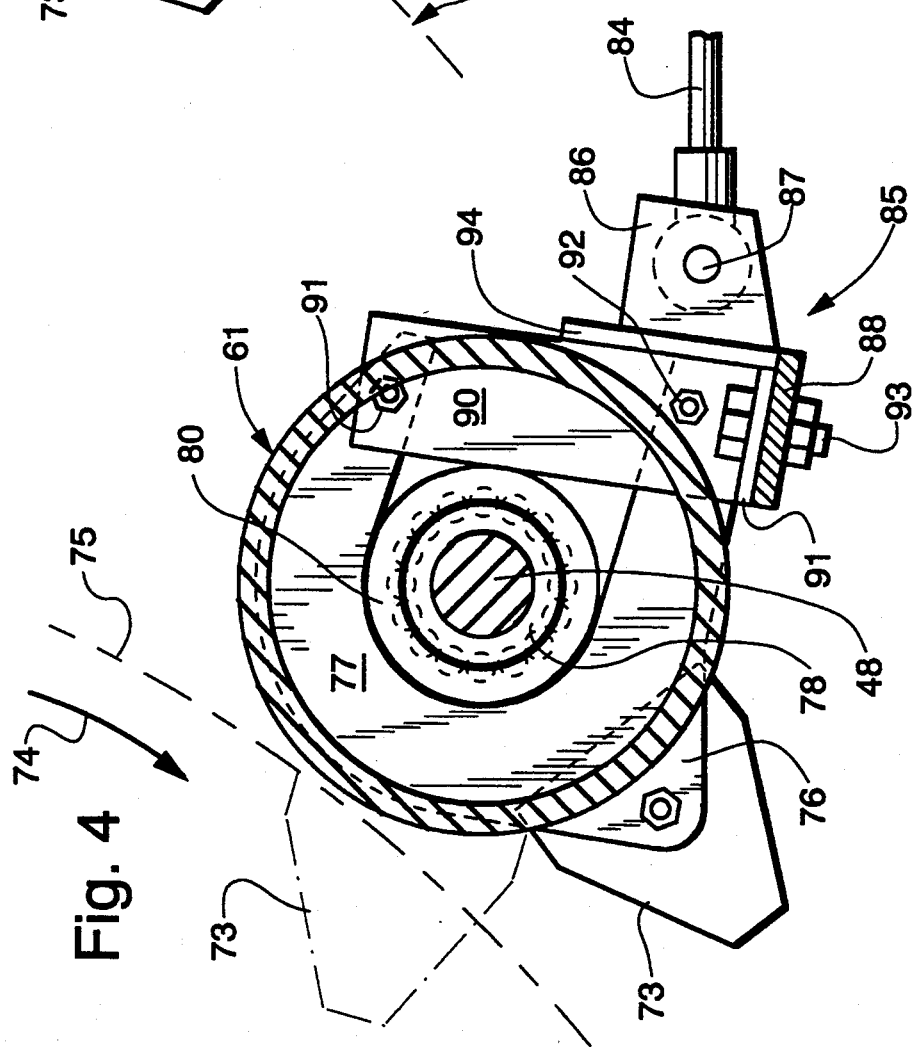

METHOD OF FORMING A SEGMENTED ROUND BALE

FIELD OF THE INVENTION

The present invention relates generally to round balers and more particularly to a new and useful method for segmenting a cylindrical package of crop material as it is being formed into a round bale.

BACKGROUND OF THE INVENTION

Agricultural machines towed by a tractor across a field for picking up windrowed crop material to form a cylindrical bale are commonly referred to as round balers. These machines have either a fixed or an expandable bale forming chamber disposed between opposing vertical sidewalls. The chamber is usually defined by a floor and transverse confining means comprising a continuous flexible apron and/or a plurality of transverse rolls. Frequently the apron includes an array of side-by-side belts trained around a series of rollers that extend between the sidewalls, and the floor consists of either a large roller or a continuous conveyor belt.

During field operation, crop material such as hay is picked up from the ground and fed into the chamber. The volume of crop material increases continuously in the chamber until a compact cylindrical package is formed. The package is wrapped while still in the chamber and then ejected onto the ground as a completed bale. Well known means for wrapping round bales include twine, net and plastic sheet material.

After the round bale has been ejected from the baler, it is either left in the field for storage until it is needed, or it is transported to a remote site for storage or use. Eventually, the baled crop material is fed out either manually or via a mechanized system.

Under certain crop conditions, such as baled silage, the crop material in the bale adheres to itself due to intertwining of crop, effect of sticky juices and moisture, etc. all of which tend to hinder the feed out process, especially in manual systems. In one prior art attempt to overcome this problem, the bale is sliced into smaller segments as disclosed in U.S. Pat. Nos. 4,549,481, issued Oct. 29, 1985 in the name of Wilbur E. Groenveld, et al, and No. 4,497,163, issued Feb. 5, 1985 in the name of Abraham Ogman. In the Groenveld, et al system, a knife is inserted into the periphery of a fully formed round bale to slice it into two cylindrically shaped parts prior to discharge from a baler. In the Ogman system, which also contemplates slicing a formed bale into two parts while it is in the bale chamber, a knife is inserted through an aperture in the baler sidewall to make a lateral cut.

In another prior art method, disclosed in U.S. Pat. No. 5,205,105, issued Apr. 27, 1993 in the name of Bernard Krone, et al, an expandable chamber round baler is shown in which cutting knives extend from the floor roll to cut crop material conveyed into the forming chamber by a crop pickup mechanism adjacent the floor roll. In the noncutting position the knife elements in the Krone, et al baler are retracted into a position within the outer shell of the floor roll.

To enhance feed out of baled crop material the present invention provides a solution to problems encountered but not solved by prior art systems. An improved method is provided that embraces and successfully resolves the problems without sacrificing reliability and effectiveness.

SUMMARY OF THE INVENTION

An important object of the present invention is to provide a new and improved method of forming a segmented round bale in a round baler without impacting the general functional performance of the baler.

In pursuance of this and other important objects the present invention contemplates a unique method of forming in a round baler a segmented cylindrical bale of crop material having a generally round cross section. More particularly the method comprising the steps of picking up crop material, feeding the picked up crop material into a bale forming chamber, forming the crop material into a mat as it enters the bale forming chamber, guiding the mat of crop material initially along the outer periphery of the bale forming chamber and subsequently along a spiral path to form a cylindrical package having a general round cross section, and severing the mat of crop material as it is being guided along the outer periphery of the bale forming chamber.

The foregoing and other objects, features and advantages of the invention will appear more fully hereinafter from a consideration of the detailed description which follows, in conjunction with the accompanying sheets of drawings wherein one principal embodiment of a round baler in which the present invention is carried out is illustrated by way of example. It is to be expressly understood, however, that the drawings are for illustrative purposes and are not to be construed as defining the limits of the invention.

DESCRIPTION OF THE DRAWINGS

FIG. 4 is a view taken in the direction of arrows 4—4 in FIG. 3.

FIG. 5 is a view similar to FIG. 4 with selected elements in their operative position.

DESCRIPTION OF THE PREFERRED EMBODIMENT

Figure 1:
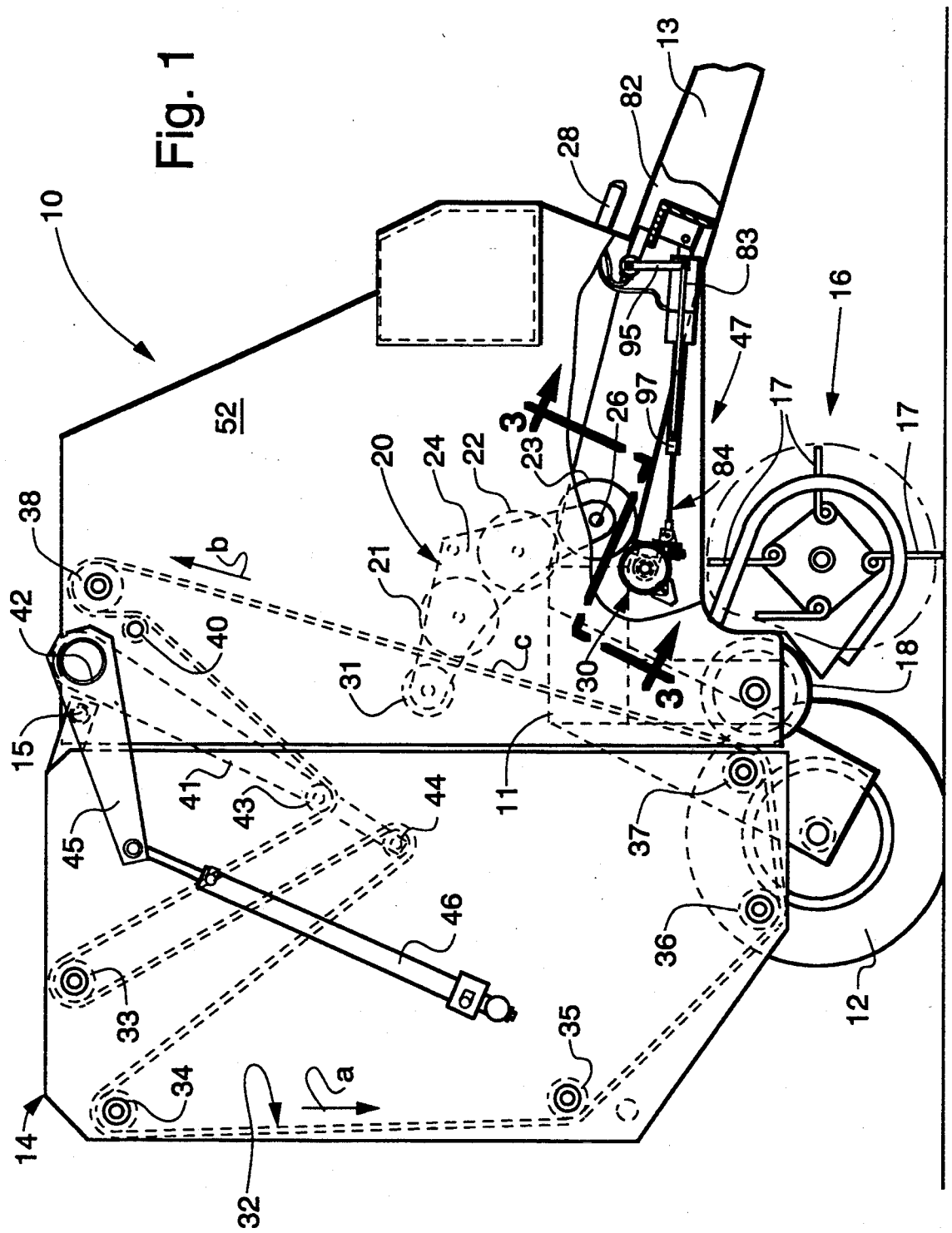
FIG. 1 is a diagrammatic side elevational view of a round baler in which the method of the present invention is readily carried out.

Referring now to the drawings for a more detailed description of the present invention, FIG. 1 shows round baler 10 of the type having an expandable chamber defined by belts and rollers, as generally disclosed in U.S. Pat. No. 4,870,812, issued Oct. 12, 1989 in the name of Richard E. Jennings, et al.

Figure 2:
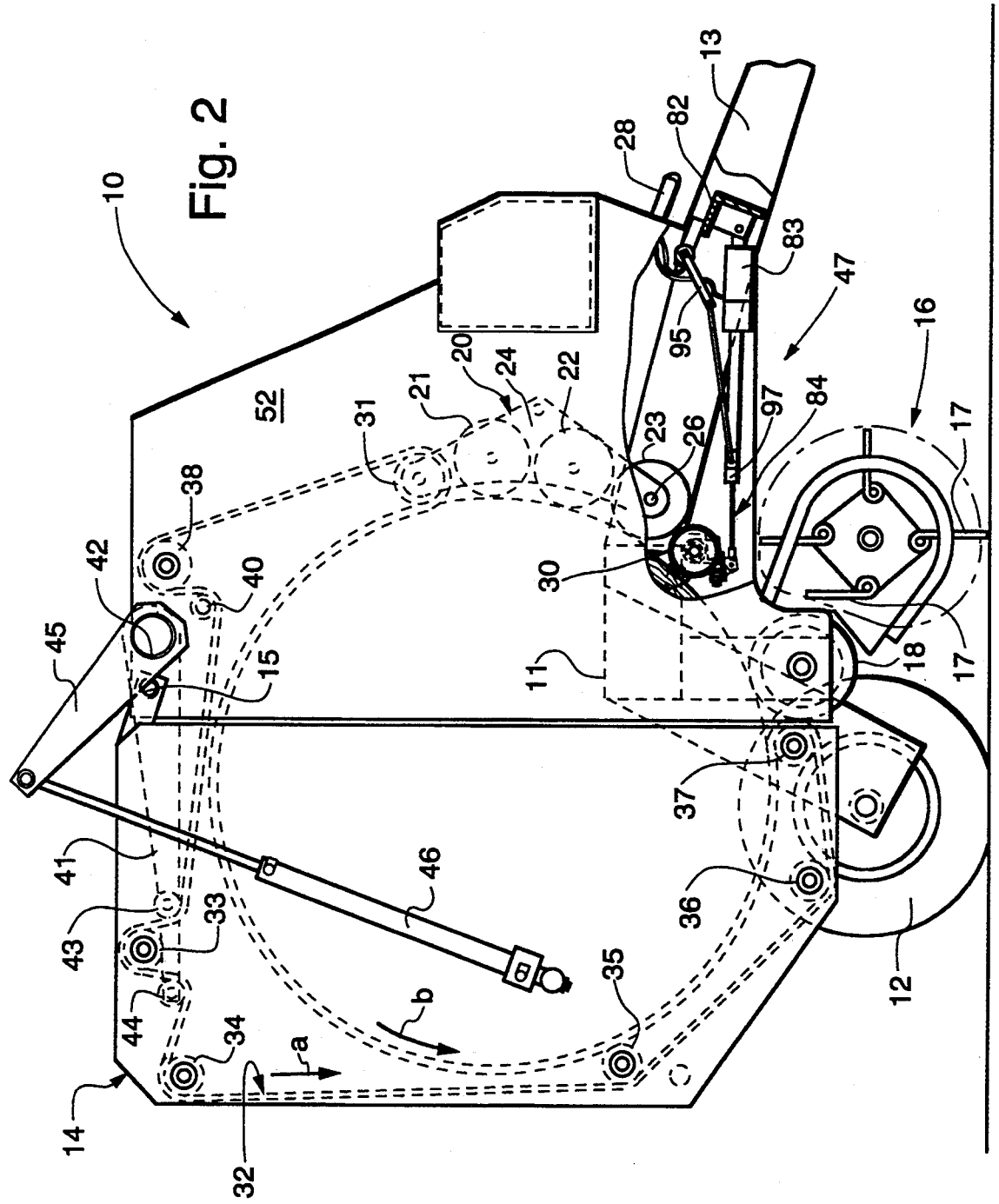
FIG. 2 is a diagrammatic side elevational view, similar to FIG. 1, of a round baler with its forming chamber in the full bale position.

Round baler 10, which incorporates the preferred embodiment of a round baler in which the present invention is carried out, includes a main frame 11 supported by a pair of wheels 12 (only one shown). A tongue 13 is provided on the forward portion of main frame 11 for connection to a tractor. Pivotally connected to the sides of main frame 11 by a pair of stub shafts 15 is tailgate 14 which may be closed (as shown in FIGS. 1 and 2) during bale formation or pivoted open about stub shafts 15 to discharge a completed bale. A conventional pickup 16, mounted on main frame 11, includes a plurality of fingers or tines 17 movable in a predetermined path to lift crop material from the ground and deliver it rearwardly toward a floor roll 18, rotatably mounted on main frame 11.

A chamber for forming bales is defined partly by a sledge assembly 20 comprising a plurality of rollers 21, 22, 23 extending transversely of the main frame 11 in the arcuate arrangement seen in FIG. 1 and 2. Rollers 21, 22, 23 are journalled at their ends in a pair of spaced apart arms 24, one of which is shown. These arms are pivotally mounted inside main frame 11 on stub shafts 26 for providing movement of sledge assembly 20 between the bale starting position shown in FIG. 1 and the full bale position shown in FIG. 2. Rollers 21, 22, 23 are driven in a counter-clockwise direction by conventional means (for example, chains and sprockets) connected with a drive shaft 28 which in turn is connected to the power-take-off of a tractor. A starter roll 30, located adjacent roller 23, is also driven counter-clockwise, as discussed below. A freely rotatable idler roller 31, carried by arms 24, moves in an arcuate path with sledge assembly 20.

The bale forming chamber is further defined by an apron 32 comprising a plurality of continuous side-by-side belts supported by guide rolls 33, 34, 35, 36, 37 rotatably mounted in tailgate 14. Apron 32 is also supported on a drive roll 38, mounted on main frame 11. Although apron 32 passes between roller 21 on sledge assembly 20 and idler roller 31, it is in engagement only with idler roller 31 and not roller 21 which is located in close proximity to the apron belts and serves to strip crop material from the belts, in addition to its bale forming function. Suitable coupling means (not shown) connected to drive shaft 28 provide rotation of drive roll 38 in a direction causing movement of apron 32 along the varying paths indicated generally by arrows a and b in FIGS. 1 and 2. An additional guide roll 40 in the main frame 11 ensures proper driving engagement between apron 32 and drive roll 38. A pair of take up arms 41 (only one shown) are pivotally mounted on main frame 11 by a cross shaft 42 for movement between inner and outer positions shown in FIGS. 1 and 2, respectively. Belt tension lever arms 45 (one shown) are also mounted to pivot with take up arms 41, which carry additional guide rolls 43, 44 for supporting apron 32. An hydraulic cylinder 46 is mounted on tail gate 14 and normally urges lever arms 45 and take up arms 41 toward their inner positions (FIG. 1), as the bale diameter increases.

When the elements of round baler 10 are disposed as shown in FIG. 1 with tailgate 14 closed, an inner course c of apron 32 extends between guide roll 37 and idler roll 31. Rollers 21, 22, 23 are inclined rearwardly on sledge assembly 20 to define with course c the bale core starting chamber. Apron inner course c forms the rear wall of the chamber while the inwardly facing peripheral surfaces of rollers 21, 22, 23 define in a general manner a rearwardly inclined cooperating front wall. Floor roll 18 defines the bottom of the chamber and starter roller 30, spaced from floor roll 18, provides the upper boundary of an inlet for crop material.

As round baler 10 is towed across a field, pickup tines 17 lift crop material from the ground and deliver it through the inlet. The crop material is carried rearwardly by floor roll 18 into engagement with apron inner course c (FIG. 1) which urges it upwardly and slightly forwardly into engagement with rollers 21, 22, 23. In this manner crop material is coiled in a clockwise direction to start a bale core. Continued feeding of crop material into the bale forming chamber by pickup tines 17 causes the apron inner course c to expand in length around a portion of the circumference of the bale core as the crop material travels in a general mat configuration along a continuously spiraling path causing the diameter to increase. Take up arms 41 rotate conjointly with lever arms 45 from their inner positions shown in FIG. 1 toward their outer positions shown in FIG. 2 to provide for expansion of the inner course of the apron in a well known manner, i.e., in effect the outer course of the belts of apron 32 is diminished in length while the inner course increases a like amount. After a bale has been formed and wrapped, tailgate 14 is opened and the bale is ejected rearwardly. Subsequent closing of tailgate 14 returns the apron inner and outer courses of the belts of apron 32 to the locations shown in FIG. 1.

During bale formation, sledge assembly 20 also moves between a bale starting position (FIG. 1) to a full bale position (FIG. 2). This movement of sledge assembly 20 causes idler roller 31 to move in an arcuate path while maintaining apron 32 in close proximity to roller 21, thereby allowing roller 21 to strip crop material from the belts of apron 32 and prevent or reduce significantly the loss of crop material between roller 21 and apron 32 during formation of a bale. Sledge assembly 20 is pushed outwardly towards its full bale position during bale formation as the crop material expands against rollers 21, 22, 23 and then subsequently is pulled inwardly by apron 32 to the position shown in FIG. 1 during bale ejection.

Figure 3:
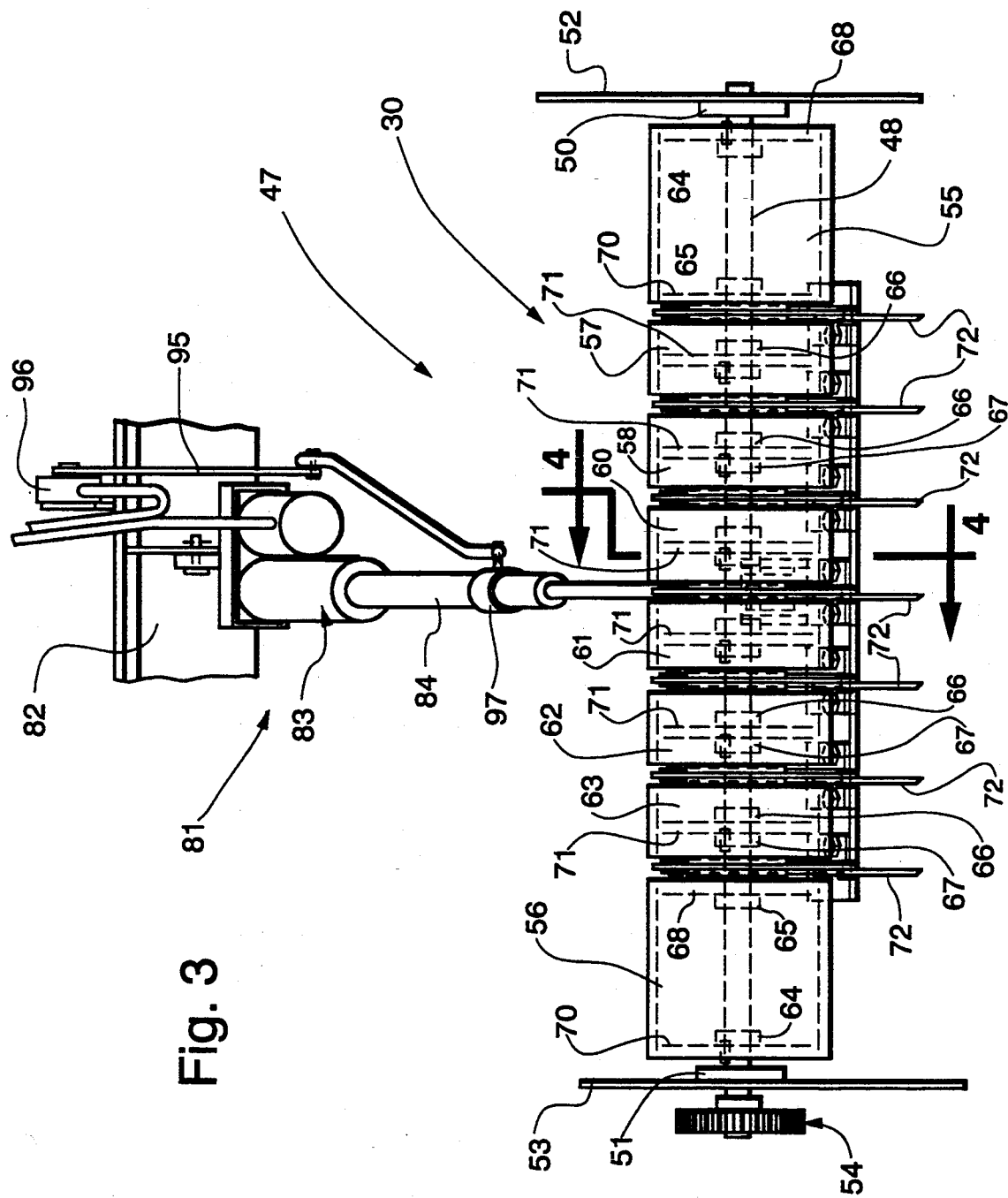
FIG. 3 is a view taken in the direction of arrows 3—3 in FIG. 1.

Now turning to the crop cutting apparatus, generally designated by reference numeral 47 in FIGS. 1 and 2, starter roll 30 shown in FIG. 3 is mounted on shaft 48, journalled for rotation in bearing assemblies 50, 51 mounted on side walls 52, 53. Gear 54 is driven in a conventional manner with rollers 21, 22, and 23 by a chain and sprocket arrangement coupled to drive shaft 28.

Starter roll 30 comprises two similar outer cylindrical segments 55, 56 and six similar inner cylindrical segments 57, 58, 60, 61, 62, 63, all of which are affixed to shaft 48 by a pair of keyed collar elements 64, 65, and 66, 67, for outer and inner segments, respectively. The outer segments 55, 56 of starter roll 30 include end walls 68, 70 to which collars 64 are affixed. Each of the inner segments include an inner wall 71 to which a pair of collars 66, 67 are affixed.

A plurality of knives 72, extending outwardly from roll 30, are mounted in the annular space between adjacent segments. Each knife 72 is generally triangularly shaped (see FIGS. 4 and 5) and includes at least one edge 73 sharpened for cutting the crop material passing in the direction designated by arrow 74. The outer periphery of the cylindrical package of crop material being rotated in the bale forming chamber is generally designated by reference numeral 75. Each knife 72 is mounted via a tab 76 to a C shaped bracket 77 which encompasses shaft 48. A bearing assembly comprising an inner race 78 encircling shaft 48 and an outer race 80 affixed to C shaped bracket 77 enables knife 72 to be rotated about shaft 48 between the positions shown in FIGS. 4 and 5.

An actuator 81 mounted on a cross member 82 of frame 11 consists of a main body portion 83 and reciprocally driven element 84, which is pivotally attached to knife mounting assembly 85 via flange 86 and pin 87. Knife mounting assembly 85 includes a transverse base member 88 from which a plurality of upright struts 90 extend for securing C shaped brackets 77 in place (via bolts 91, 92) on and for rotation about shaft 48. Upright struts 90 include flange portions 91 which are secured to base member 88 via bolts 93. Completing mounting assembly 85 is rectangular plate 94 integral with flange 86 and extending upwardly from and also integral with transverse base member 88. It should be noted that the entire mounting assembly could be conveniently fabricated as a unitary weld assembly to yield the same result.

The position of driven actuator element 84 determines the angular position of pivoting leg 95 relative to electrical sensing means 96. Thus, as the position of bracket 97 moves with element 84 relative to main body portion 83, leg 95 rotates about the axis of sensing means 96, which angular position is ascertainable by conventional electrical sensing means. The retracted and extended knife positions correspond to the two positions of leg 95 shown in FIGS. 1 and 2.

In carrying out the present invention, as baler 10 is pulled across a field, pickup 16 picks up a windrow of crop material formed on the field and transforms it into a transverse mat of crop material that is fed through the inlet of a bale forming chamber in a conventional manner. As the mat of material is guided initially along the outer periphery of the bale forming chamber and subsequently in a spiral fashion to form the cylindrical package of crop material, the crop forming elements expand to accommodate the constantly increasing diameter of the cylindrical package of crop that will eventually be wrapped and discharged onto the field as a completed round bale.

With resect to the severing function, the knives of crop cutting mechanism 47 are initially in the position shown in FIG. 4. Depending on the operators desire based on the condition and type of crop being baled, knives 72 are incrementally rotated to any position between the positions shown in FIGS. 4 and 5 during the time the bale is being formed. When the knives are extended into the chamber to the position shown in FIG. 5, the mat of material on the outside of the spiralling mat is engaged and cut after it has completed its travel along the expanding chamber and prior to being formed into the interior the package as it is being formed. The crop is severed in approximately the same transverse location to facilitate bale feed out, i.e., as long as the knives are in operative position a radial slice is being defined in the crop material.

In the event the conditions are such that the operator desires to reduce the severing action he has several options, one of which was mentioned above relative to the incremental positioning of the knives. He can also reduce the numbers of knives by removing knives and forming a new pattern, e.g., remove alternate knives, or he has the option of retracting the knives during a selected portion of the bale forming cycle during operation, all of which options vary the slices being formed and accordingly the segmented nature of the final bale.

Of the many implicit and explicit advantages of the present invention is its ability to modify existing round baler elements to provide structure for carrying out the present invention and yet not affect the general overall function of the baler. Further, there is inherently less debris in the starter roll area which improves reliability and durability, but additionally, any debris that does occur during cutting drops to the mat of material that is being guided into the bale chamber below the severing mechanism. Still further, to cut the hay in a location where the mat is more distinctly defined enhances significantly the desired result of a clearly defined slice.

While preferred structure in which the principles of the present invention are carried out is shown and described above, it is to be understood that the invention is not limited to such structure, but that, in fact, widely different means of varying scope and configuration may be employed in the practice of the invention.

Having thus described the invention, what is claimed is:

1. A method of forming in a round baler a segmented cylindrical bale of crop material having a generally round cross section, said method comprising the steps of
   picking up crop material,
   feeding said picked up crop material into a bale forming chamber,
   forming said crop material into a mat as it enters said bale forming chamber,
   guiding said mat of crop material initially along the outer periphery of said bale forming chamber and subsequently along a spiral path to form a cylindrical package having a general round cross section, and
   severing said mat of crop material as it is being guided along said outer periphery of said bale forming chamber.

2. In a method as set forth in claim 1 wherein said forming step further comprises
   conveying said picked up material in a generally horizontal direction as it is being formed into a mat and prior to being guided along said outer periphery of said bale forming chamber.

3. In a method as set forth in claim 2 wherein said severing step takes place under conditions where said mat of crop material is being guided along said spiral path in the general direction of subsequently picked up material being conveyed in said generally horizontal direction.

4. In a method as set forth in claim 3 wherein said severing takes place at a plurality of horizontally spaced locations.

5. In a method as set forth in claim 4 wherein said severing takes place in vertical planes to continuously segment said mat in a manner that provides vertical slices in said cylindrical package.

6. In a method as set forth in claim 1 wherein said severing takes place at a plurality of horizontally spaced locations.

7. In a method as set forth in claim 6 wherein said severing takes place in vertical planes to continuously segment said mat in a manner that provides vertical slices in said cylindrical package.

* * * * *